Oct. 16, 1923.

W. A. READY 1,470,642

CLAMP SUPPORT

Filed March 10, 1921

Inventor:
William A. Ready,
by his attorney

Patented Oct. 16, 1923.

1,470,642

UNITED STATES PATENT OFFICE.

WILLIAM A. READY, OF BROOKLINE, MASSACHUSETTS, ASSIGNOR TO NATIONAL COMPANY, OF CAMBRIDGE, MASSACHUSETTS, A CORPORATION OF MASSACHUSETTS.

CLAMP SUPPORT.

Application filed March 10, 1921. Serial No. 451,219.

*To all whom it may concern:*

Be it known that I, WILLIAM A. READY, a citizen of the United States, residing at Brookline, in the county of Norfolk and State of Massachusetts, have invented new and useful Improvements in Clamp Supports, of which the following is a specification.

This invention relates to a clamp support for pipe hangers or electrical fittings and is particularly adapted to be attached to structural beams such as channel beams, I-beams and the like.

The object of the invention is to provide a strong and simple device which can be adjusted to fit on and be clamped to structural beams of different kinds and which is capable of supporting a pipe or other article to be suspended. In use a plurality of said clamp supports are attached to a beam, each of said clamp supports carrying a pipe hanger whereby a length of piping may be supported.

The invention consists in a clamp support such as hereinafter set forth in the specification and embodying the combinations of elements set forth in the claims.

Referring to the drawings.

Like numerals refer to like parts throughout the several views of the drawings.

Figure 1:
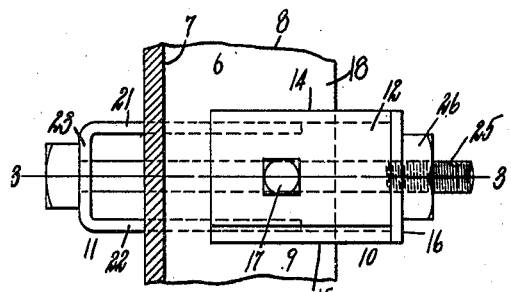
Figure 1 is a plan view of my improved clamp support showing the same attached to a portion of the channel iron.
Figure 2:
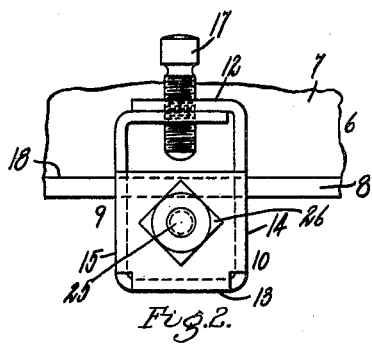
Fig. 2 is a side elevation viewed from the right of Fig. 1.
Figure 4:
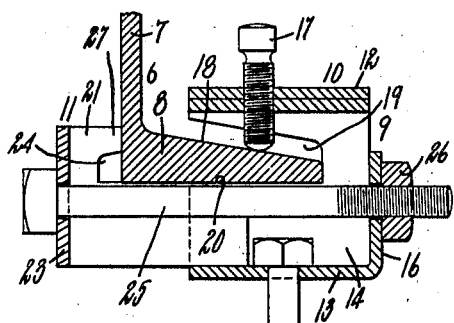
Fig. 4 is a sectional elevation of the clamp support showing the same attached to a channel beam and with a pipe hanger and pipe shown in connection therewith.

In the drawings, referring to Figures 1 and 4 inclusive, 6 is a portion of a channel beam of which 7 is the web and 8 the lower flange. 9 is a clamp support consisting of two members 10 and 11. The member 10 is preferably formed of a piece of sheet metal bent to form a top portion 12, a bottom portion 13, two side portions 14 and 15 and an outer end portion 16, the top portion 12 being formed by two ends of the sheet metal overlapping each other. A screw 17 has screw-threaded engagement with the top portion 12 and is adapted to bear against the upper face 18 of the flange 8. The portions 14 and 15 are each provided with a slot 19 into which the flange 8 projects. When the screw 17 is tightened it draws the lower edges 20 of the slots 19 against the lower face of the flange 8. The member 11 is U-shaped in plan view and consists of two side portions 21 and 22 joined together by an end portion 23. The side portions 21 and 22 are slidable within the member 10 and each of said side portions is provided with a slot 24. A bolt 25 connects the two members 10 and 11 together extending through holes provided in the end portions 16 and 23 of said members which may be drawn toward each other and into clamping engagement with the beam by tightening a nut 26 on said bolt, thus the two members will be brought into engagement with opposite sides of the beam. In the case of a channel beam, the ends of the slots 19 will be brought against the outer edge of the flange 8 and the hooked portion 27 of the sides 21 and 22 will be brought into engagement with the web of the channel as illustrated in Fig. 4. 28 is a hanger of well known construction in which is supported a pipe 29, the hanger having overlapping ends 30 and 31 through which a bolt 32 extends, the upper end of said bolt extending through the bottom portion 13 of the member 10 with its head resting on said bottom portion.

In assembling the device and placing the clamp support in position upon the beam the bolt 32 is inserted in the bottom portion 13 of the member 10 and the parts are then assembled upon the beam by slipping the member 10 on to one side of the beam with the flange 8 projecting into the slots 19. The member 11 is then pushed up against the beam with the hooked portion 27 contacting with the web thereof and the two members are drawn toward each other until they bear firmly against opposite sides of the beam by tightening up the nut 26. The clamp support is firmly drawn against the lower face of the flange 8 by tightening up the screw 17. The overlapping ends 30, 31 are pushed up on the bolt 32 and held thereon by the nut 31'.

Figure 5:
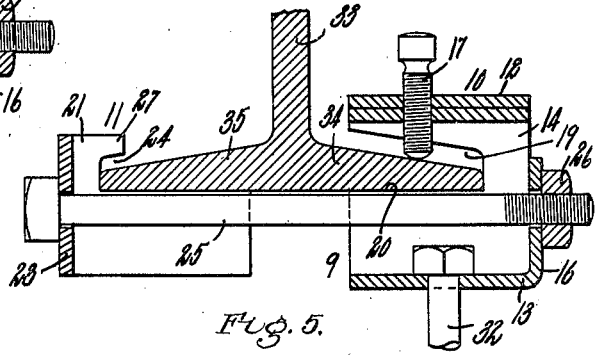
Fig. 5 is a sectional elevation similar to Fig. 4 illustrating the clamp support applied to an I-beam.
Figure 3:
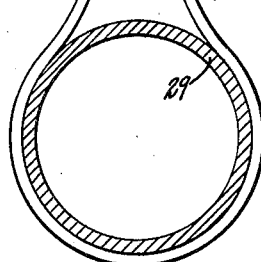
Fig. 3 is a side elevation of the clamp detached from the beam.
Figure 3:
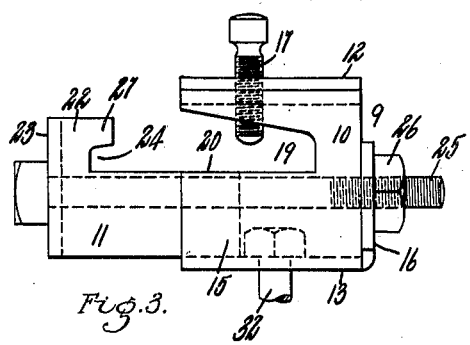

Referring to Figure 5, 33 is an I-beam, 10 and 11 are the members of the clamp, 25 the bolt, 32 the hanger bolt, 17 the screw and 34 and 35 the flanges of the I-beam. The parts are assembled in the same manner as hereinbefore described for assembling the parts upon a channel beam, except that the flange 35 projects into the slot 24 in the side portions 21 and 22 of the U-shaped member 11, and when the two members of the clamp support are drawn together by the nut 25 and bolt 26, they will engage the outer edges of the flanges 34 and 35 instead of the outer edge of the flange 8 and one face of the web 7. In both cases, however, namely in fastening the clamp to the channel beam and in fastening the clamp to the I-beam the two members of the clamp when drawn toward each other to clamp the beam contact with a portion of the opposite sides of the beam.

I claim:

1. A clamp support having, in combination, two oppositely disposed members adapted to simultaneously engage opposite sides of a flanged beam, one of said members embodying a bottom portion, two side portions, two overlapping top portions and an outer end portion, said side portions each having a slot adapted to receive one flange of said beam and a bolt connecting said members together and extending through said end portion; whereby said members may be drawn toward each other and into engagement with opposite sides of said beam and a screw having screw-threaded engagement with the top portions of said member and adapted to engage the upper face of said flange whereby the lower edges of said slots may be brought into contact with the lower face of said flange and the side portions of said member held in position relatively to each other.

2. A clamp support having, in combination, two oppositely disposed members adapted to simultaneously engage opposite sides of a flanged beam, one of said members having a bottom, two upwardly bent side portions, two inwardly bent overlapping top portions and an outer end portion abutting against the edges of said side portions, said side portions being slotted to receive one flange of said beam, the other of said members being U-shaped and adapted to slide into and out of said first-named member and a bolt adapted to draw said members toward each other and into engagement with opposite sides of said beam, and a screw having screw-threaded engagement with the top portion of said member and adapted to engage the upper face of said flange whereby the lower edges of said slots may be brought into contact with the lower face of said flange and the side portions of said member held in position relatively to each other.

In testimony whereof I have hereunto set my hand in presence of two subscribing witnesses.

WILLIAM A. READY.

Witnesses:
FRANKLIN E. LOW,
HERMAN R. HOFFMAN.